(12) United States Patent
Lynn (10) Patent No.: US 10,597,317 B1
(45) Date of Patent: Mar. 24, 2020

(54) SYSTEMS FOR CREATING AN OXIDATION REDUCTION POTENTIAL (ORP) IN WATER FOR PATHOGENIC CLEANSING AND/OR DEGREASING OF HARD SURFACES AND EQUIPMENT

(71) Applicant: Daniel W. Lynn, Omaha, NE (US)

(72) Inventor: Daniel W. Lynn, Omaha, NE (US)

( * ) Notice: Subject to any disclaimer, the term of this patent is extended or adjusted under 35 U.S.C. 154(b) by 0 days.

(21) Appl. No.: 16/588,073

(22) Filed: Sep. 30, 2019

Related U.S. Application Data (63) Continuation-in-part of application No. 15/476,326, filed on Mar. 31, 2017.

(51) Int. Cl.
| | |
|---|---|
| B01D 29/00 | (2006.01) |
| B09C 1/00 | (2006.01) |
| C02F 1/78 | (2006.01) |
| C01B 13/11 | (2006.01) |
| B01F 5/04 | (2006.01) |
| B01F 3/04 | (2006.01) |
| C02F 1/00 | (2006.01) |
| C05F 7/00 | (2006.01) |
| C05F 9/00 | (2006.01) |
| F25C 1/00 | (2006.01) |

(52) U.S. Cl.
CPC ............ *C02F 1/78* (2013.01); *B01F 3/04503* (2013.01); *B01F 5/0428* (2013.01); *C01B 13/11* (2013.01); *B01F 2003/04886* (2013.01); *C02F 2201/782* (2013.01); *C02F 2209/04* (2013.01); *C02F 2209/23* (2013.01); *C02F 2209/40* (2013.01); *C02F 2303/04* (2013.01)

(58) Field of Classification Search
USPC ...... 210/85, 87, 90, 96.1, 97, 136, 137, 150, 210/151, 192, 202, 259, 607, 614, 631, 210/724, 739, 741, 743, 746, 750, 760, 210/769
See application file for complete search history.

(56) References Cited

U.S. PATENT DOCUMENTS

| | | | |
|---|---|---|---|
| 6,153,105 | A | 11/2000 | Tadlock et al. |
| 6,334,328 | B1 | 1/2002 | Brill |
| 8,071,526 | B2 | 12/2011 | Lynn |
| 8,075,705 | B2 | 12/2011 | Lynn |
| 9,068,149 | B2 | 6/2015 | Lynn |
| 9,151,528 | B2 | 10/2015 | Erbs et al. |
| 9,174,845 | B2 | 11/2015 | Lynn |
| 9,522,348 | B2 | 12/2016 | Lynn |
| 2006/0027463 | A1* | 2/2006 | Lavelle .................. C01B 13/10 205/556 |
| 2009/0142225 | A1 | 6/2009 | Tornqvist |

(Continued)

*Primary Examiner* — Hayden Brewster
(74) *Attorney, Agent, or Firm* — Dennis L. Thomte; Thomte Patent Law Office LLC (57) ABSTRACT

A system for creating an oxidation reduction potential (ORP) in water and for reducing the surface tension of the water for the pathogenic cleansing and/or degreasing of hard surfaces and equipment. The hard surfaces to be cleansed and/or degreased may be plastic, glass, ceramic, porcelain and stainless steel. The equipment to be cleansed and/or degreased may be food service equipment such as ovens, ranges, fryers, grills, steam cookers, refrigerators, coolers, holding cabinets, cold food tables, work tables, beverage dispensing equipment, beer dispensers, shelving, food displays, dish washing equipment and grease traps.

12 Claims, 7 Drawing Sheets

(56) References Cited

U.S. PATENT DOCUMENTS

2013/0341285 A1    12/2013   Marion
2014/0027388 A1     1/2014   Constant
2014/0263097 A1     9/2014   Lynn
2016/0251243 A1     9/2016   Lynn

* cited by examiner

SYSTEMS FOR CREATING AN OXIDATION REDUCTION POTENTIAL (ORP) IN WATER FOR PATHOGENIC CLEANSING AND/OR DEGREASING OF HARD SURFACES AND EQUIPMENT

CROSS-REFERENCE TO RELATED APPLICATIONS

This application is a Continuation-in-Part application of U.S. application Ser. No. 15/476,326 filed Mar. 31, 2017 entitled SYSTEMS AND METHODS FOR CREATING AN OXIDATION REDUCTION POTENTIAL (ORP) IN WATER FOR PATHOGENIC CLEANSING AND/OR DEGREASING OF HARD SURFACES AND EQUIPMENT

BACKGROUND OF THE INVENTION

Field of the Invention

This invention relates to improved systems for creating an oxidation reduction potential (ORP) in water for pathogenic control. Even more particularly, this invention relates to systems for substantially lowering the surface tension of the water in a water and ozone solution for the pathogenic cleansing and/or degreasing of hard surfaces and equipment such as food service equipment. Even more particularly, this invention relates to a system including a regulator which includes means for adjusting the water flow therethrough and a system for adjusting the ozone flow into the regulator. Even more particularly, this invention includes means for supplying a pressurized air supply stream to a desiccate air dryer which is connected to the ozone generator of the invention.

Description of the Related Art

Water intended for potable use (e.g., drinking water), may contain disease-causing organisms, or pathogens, which can originate from the source of the water, from resistance to water treatment techniques, from improper or ineffectual water treatment techniques, or so forth. Pathogens include various types of bacteria, viruses, protozoan parasites, and other organisms. To protect drinking water from disease-causing organisms, or pathogens, water suppliers often add a disinfectant, such as chlorine, to the water. However, disinfection practices can be ineffectual because certain microbial pathogens, such as *Cryptosporidium*, are highly resistant to traditional disinfection practices. Also, disinfectants themselves can react with naturally-occurring materials in the water to form byproducts, such as trihalomethanes and haloacetic acids, which may pose health risks.

A major challenge for water suppliers is how to control and limit the risks from pathogens and disinfection byproducts. It is important to provide protection from pathogens while simultaneously minimizing health risks to the population from disinfection byproducts. Oxidation reduction potential (ORP) can be used for water system monitoring to reflect the antimicrobial potential of the water, without regard to the water quality, with the benefit of a single-value measure of the disinfection potential, showing the activity of the disinfectant rather than the applied dose.

The prior art does not provide systems and methods for cleansing and/or degreasing equipment such as food service equipment. Further, the prior art does not provide systems and methods for cleansing and/or degreasing hard surfaces such as plastic, glass, ceramic, porcelain, stainless steel, etc.

The co-pending application represents an improvement in the art. The instant application represents a further improvement in the art in that the instant invention includes a regulator for adjusting the flow of water therethrough and for adjusting the flow of ozone into the regulator so that the desired ORP may be obtained to cleanse and/or degrease hard surfaces and equipment, such as food service equipment. In the prior art device, the air pressure supplied to the air inlet side of the ozone generator or generator may not be sufficient to efficiently produce ozone or the air pressure of the air being supplied to the ozone generator or generator may vary which influences the production of ozone.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A system for creating an oxidation reduction potential (ORP) in water for pathogenic control is described. The system of this invention includes a plurality of ozone generators which are connected together in a series manner. In the preferred embodiment, pressurized and dried air is supplied to the ozone generators. The ozone generated by the plurality of ozone generators is supplied to an ozone adjustment housing. The ozone adjustment housing includes an elongated bore or ozone passageway having an ozone inlet end and an ozone discharge end. A metering screw is selectively movable into the elongated bore of the ozone adjustment housing for selectively adjusting the flow of ozone therethrough. The ozone adjustment housing is mounted on a regulator having a water inlet end and an ozone-water solution discharge end. A first bore extends between the water inlet end of the regulator and the ozone-water solution discharge end of the regulator. An adjustable water metering screw extends into the regulator with the inner end of the water metering screw selectively extending into the first bore to enable the flow of water through said first bore to be selectively adjusted.

A second bore extends between the water inlet end of the regulator and a venturi chamber formed in the regulator. A third bore extends from the venturi chamber to the ozone-water solution discharge end of the regulator. The discharge end of the elongated bore of the ozone adjustment housing is in communication with the venturi chamber. The water flowing through the Venturi chamber causes a venturi effect which will draw ozone from the elongated bore in the ozone adjustment housing into the venturi chamber to create a water-ozone solution which is supplied to the ozone-water discharge opening for further mixture with the water passing outwardly from the discharge end of the first bore of the regulator.

A plurality of the systems of this invention may be mounted in a cabinet mounted on a supporting wall with the outputs of the systems being fluidly connected together in a parallel manner to supply the water and ozone solution, having an ORP and surface tension suitable for the pathogenic cleansing and/or degreasing of equipment and hard surfaces to cleanse and disinfect those areas.

The systems of this invention reduce the surface tension of the water from about 72 Millinewtons per meter at 20 degrees Centigrade to about 48-58 Millinewtons per meter at 20 degrees Centigrade. The reduced surface tension of the water and ozone solution of this invention enables the solution to cleanse and degrease hard surfaces and equipment by attacking any biofilm on the hard surfaces and equipment.

The system of this invention includes an electrically operated and variable air pump which supplies pressurized air to an air dryer which supplies dried air to the ozone generator or generator in a steady uniform pressure.

It is a principal object of the invention to provide improved systems for creating an oxidation reduction potential (ORP) in water for pathogenic control.

A further object of the invention is to entirely replace the use of chlorine in all the processes performed within a facility such as fruit and vegetable handling facilities and food service facilities.

A further object of the invention is to provide a system designed to reduce the effects of the environmental damages caused by the corrosive properties of chlorine on the floors, walls and equipment within a facility such as fruit and vegetable handling facilities and food service facilities.

A further object of the invention is to provide a system wherein the water and ozone solution produced by the system will not harm persons coming into contact with the water and ozone solution of this invention.

Still another object of the invention is to provide a water and ozone solution which is a FDA approved antimicrobial agent and which has FDA approval for contact with food or as a food additive.

A further object of the invention is to provide systems for reducing the surface tension of the water and ozone solution so that the water and ozone solution may be used to pathogenically cleanse and/or degrease equipment such as food service equipment.

A further object of the invention is to provide systems for reducing the surface tension of the water and ozone solution so that the water and ozone solution may be used to pathogenically cleanse and/or degrease hard surfaces such as plastic, glass, ceramic, porcelain, and stainless steel.

A further object of the invention is to provide a system for reducing the surface tension of ordinary water.

A further object of the invention is to provide a system for creating an oxidation reduction potential (ORP) in water which includes a regulator for adjusting the water flow through the regulator and for adjusting the flow of ozone into the flow of water flowing through the regulator.

A further object of the invention is to provide a system which includes a variable air pump which supplies pressurized air to an air dryer which supplies pressurized and dried air to the ozone generator or generator of the invention.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The instant invention is to provide a system for cleansing and/or degreasing hard surfaces such as plastic, glass, ceramic, porcelain and stainless steel. The instant invention also provides a system for cleansing and/or degreasing equipment such as food service equipment which may be ovens, ranges, fryers, grills, steam cookers, refrigerators, coolers, holding cabinets, cold food tables, work tables, beverage dispensing equipment, beer dispensers, shelving food displays, dish washing equipment, and grease traps.

An Oxidation reduction potential (ORP) value can be used for water system monitoring to reflect the antimicrobial potential of a given sample of water. ORP is measured in millivolts (my), with typically no correction for solution temperature, where a positive voltage shows a solution attracting electrons (e.g., an oxidizing agent). For instance, chlorinated water will show a positive ORP value whereas sodium sulfite (a reducing agent) loses electrons and will show a negative ORP value. Similar to pH, ORP is not a measurement of concentration directly, but rather of activity level. In a solution of only one active component, ORP indicates concentration. The World Health Organization (WHO) adopted an ORP standard for drinking water disinfection of 650 millivolts. That is, the WHO stated that when the oxidation-reduction potential in a body of water measures 650 (about ⅔ of a volt), the sanitizer in the water is active enough to destroy harmful organisms almost instantaneously. For example *E. coli, Salmonella, Listeria*, and Staph pathogens have survival times of under 30 seconds when the ORP is above 650 mV, compared against >300 seconds when it is below 485 mV.

An example ORP sensor uses a small platinum surface to accumulate charge without reacting chemically. That charge is measured relative to the solution, so the solution "ground" voltage comes from the reference junction. For example, an ORP probe can be considered a millivolt meter, measuring the voltage across a circuit formed by a reference electrode constructed of silver wire (in effect, the negative pole of the circuit), and a measuring electrode constructed of a platinum band (the positive pole), with the water in-between.

Increasingly, microbial issues are commanding the attention of water treatment operators, regulators, media, and consumers. There are many treatment options to eliminate pathogenic microbes from drinking water. One such option includes ozone (O₃), an oxidizing agent approved for drinking water treatment by the U.S. Environmental Protection Agency. For instance, ozone is one of the strongest disinfectants approved for potable water treatment capable of inactivating bacteria, viruses, *Giardia*, and *Cryptosporidium*.

Accordingly, the present disclosure is directed to systems for creating an oxidation reduction potential (ORP) in water for pathogenic control. An example system includes an ozone generator, a water inlet, a water outlet, and an adjustable regulator coupled with each of the ozone generator, the water inlet, and the water outlet. Such example system is configured to output water having an ORP of about 600 mV to about 800 mV, with particular implementations being configured to output water having an ORP of about 650 mV to about 750 mV to provide pathogenic control.

Further, the present disclosure is specifically directed to a system for reducing the surface tension of the water being used to cleanse and/or degrease hard surfaces and equipment by creating a water and ozone solution wherein the surface tension of the water is reduced from about 72 Millinewtons per meter at 20 degrees Centigrade to about 48-58 Millinewtons per meter at 20 degrees Centigrade to greatly improve the cleansing and/or degreasing qualities thereof.

The present invention will now be described. Referring now to the drawings, the numeral 10 refers to the system of this invention for creating an oxidation reduction potential (ORP) in water for pathogenic control. System 10 includes a plurality of transformers 12 which are electrically connected to ozone generators 14 in conventional fashion. The first ozone generator 14 is connected to a connector 16 by air tube 17. Connector or terminal 16 is connected to a source of air which will be described in more detail hereinafter. The ozone generators 14 are connected to one another in a series manner in conventional fashion. The last ozone generator 14 in the series of ozone generators 14 has a discharge tube 18 extending therefrom.

The system 10 of this invention is preferably mounted in a wall mounted box or cabinet 20 having a cover 22. A power cord 24 extends into cabinet 20 for powering the components therein in conventional fashion. The numeral 26 refers to a water inlet which is in communication with a source of water. A pipe 28 extends inwardly from inlet 26 and has an electrical controlled valve 29 imposed therein. Pipe 30 extends from the discharge side of valve 29. System 10 includes a water-ozone solution outlet pipe or tube 32 extending from cabinet 20. A pipe or tube 34 extends inwardly from outlet pipe 30. The numeral 36 refers to a regulator which is positioned between the pipes 30 and 34.

Figure 1:
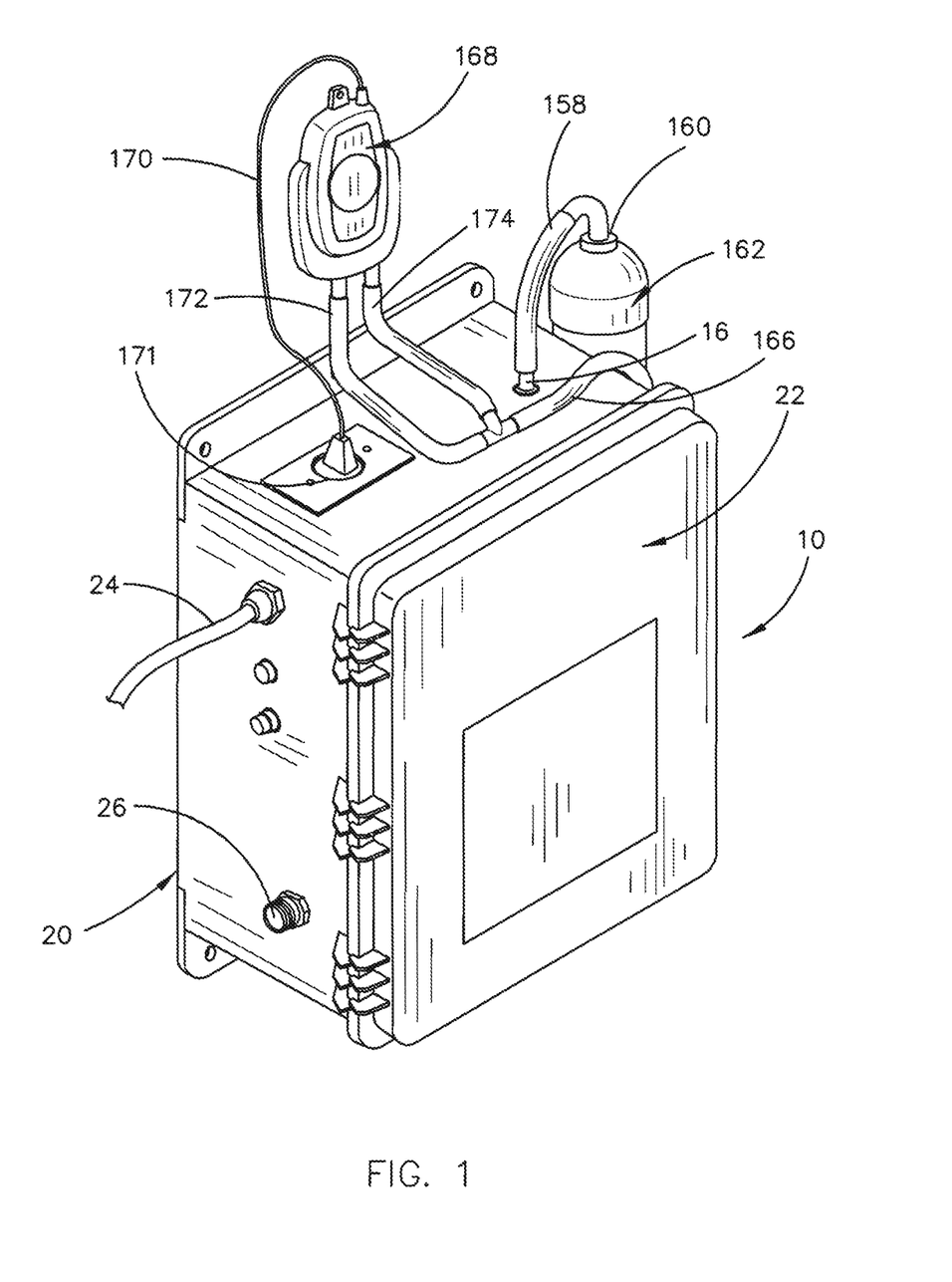
FIG. 1 is a front perspective view of the cabinet in which the instant invention is enclosed.
Figure 2:
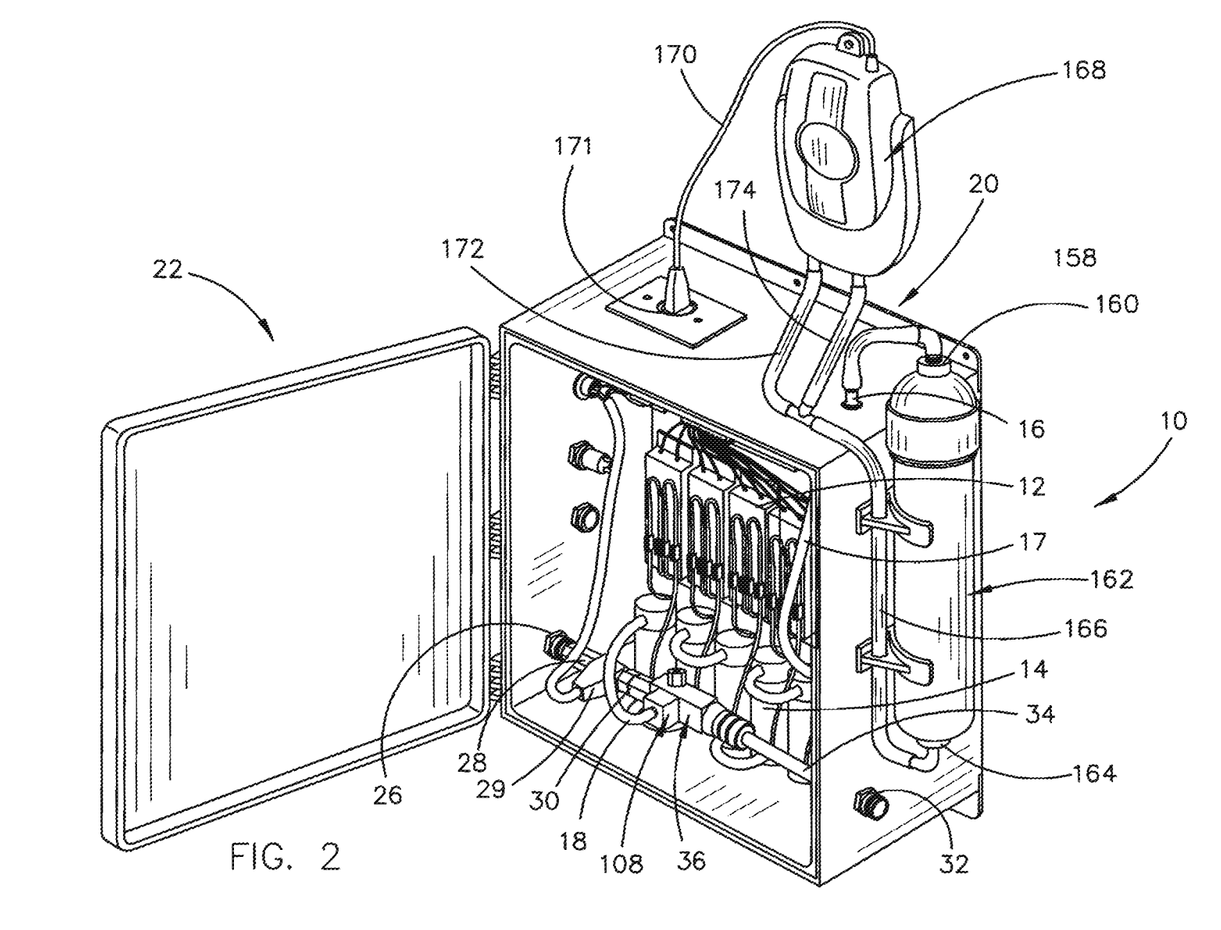
FIG. 2 is a front perspective view of the cabinet of FIG. 1 with the door thereof being open.
Figure 3:
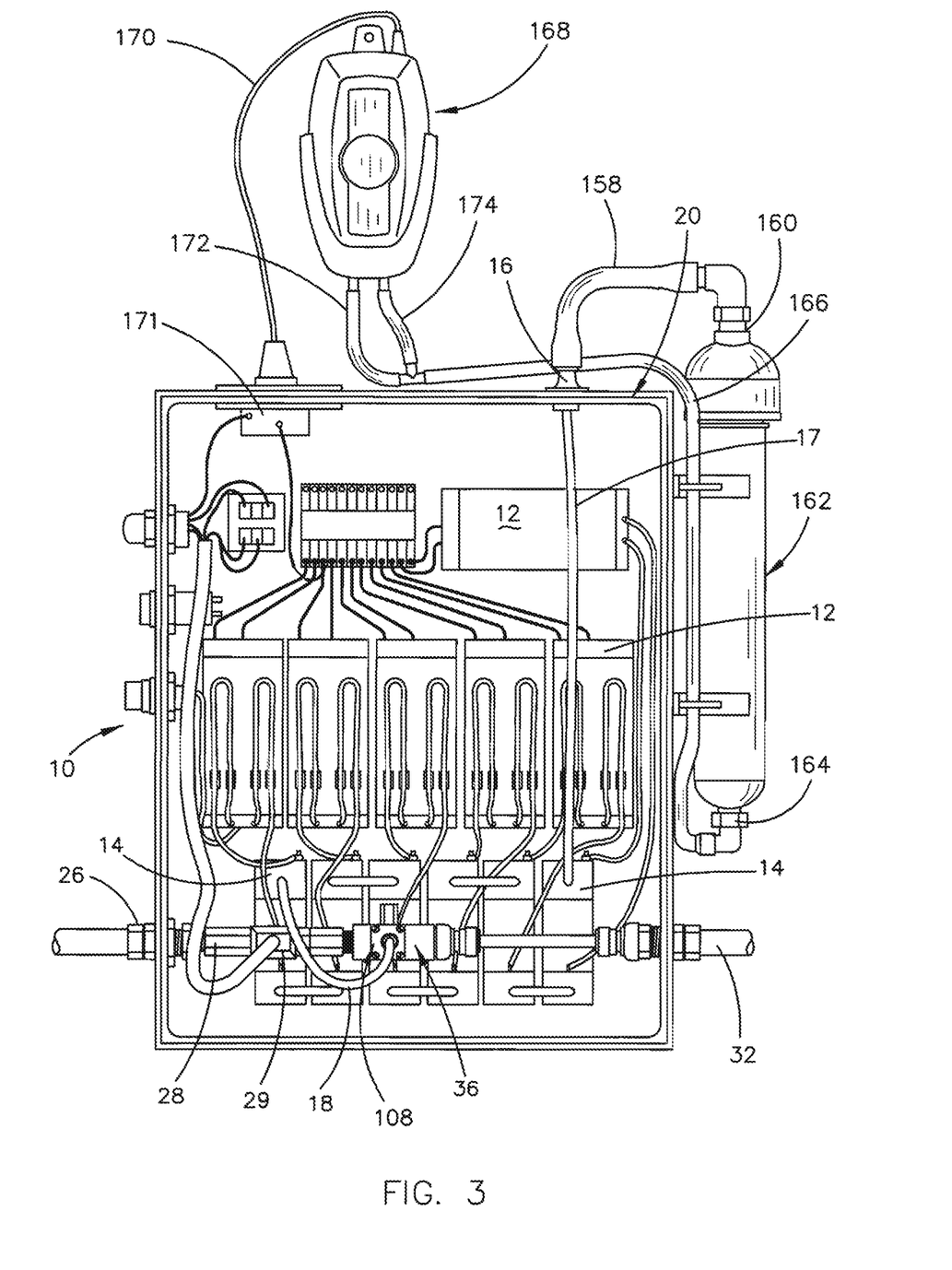
FIG. 3 is a front view of the instant invention positioned in the open cabinet.
Figure 4:
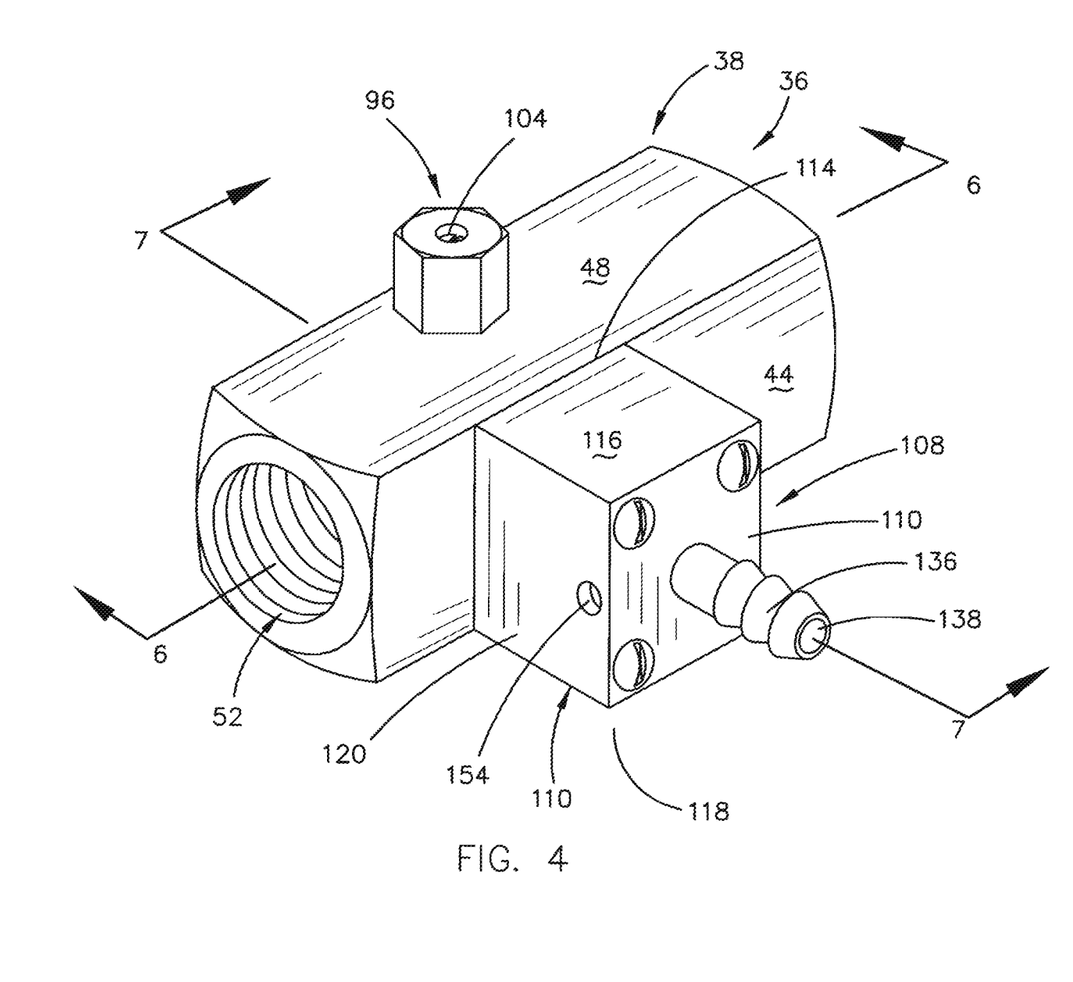
FIG. 4 is a perspective view of the adjustable water flow and gas regulator of the invention.

For purposes of description, regulator 36 will be described as being in the position illustrated in FIGS. 2 and 3 although the regulator 36 could be positioned in other positions and attitudes. Regulator 36 includes an elongated body 38 with a first end 40, a second end 42, a front side 44, a back side 46, an upper side 48 and a lower side 50. The first end 40 of regulator 36 has a water inlet opening 52 extending thereinto with the water inlet opening 52 having an inner end 54 and an outer end 56. The second end 42 of elongated body 38 has a water-ozone solution discharge opening 58 extending thereinto with the water-ozone solution discharge opening 58 having an inner end 60 and an outer end 62.

Figure 7:
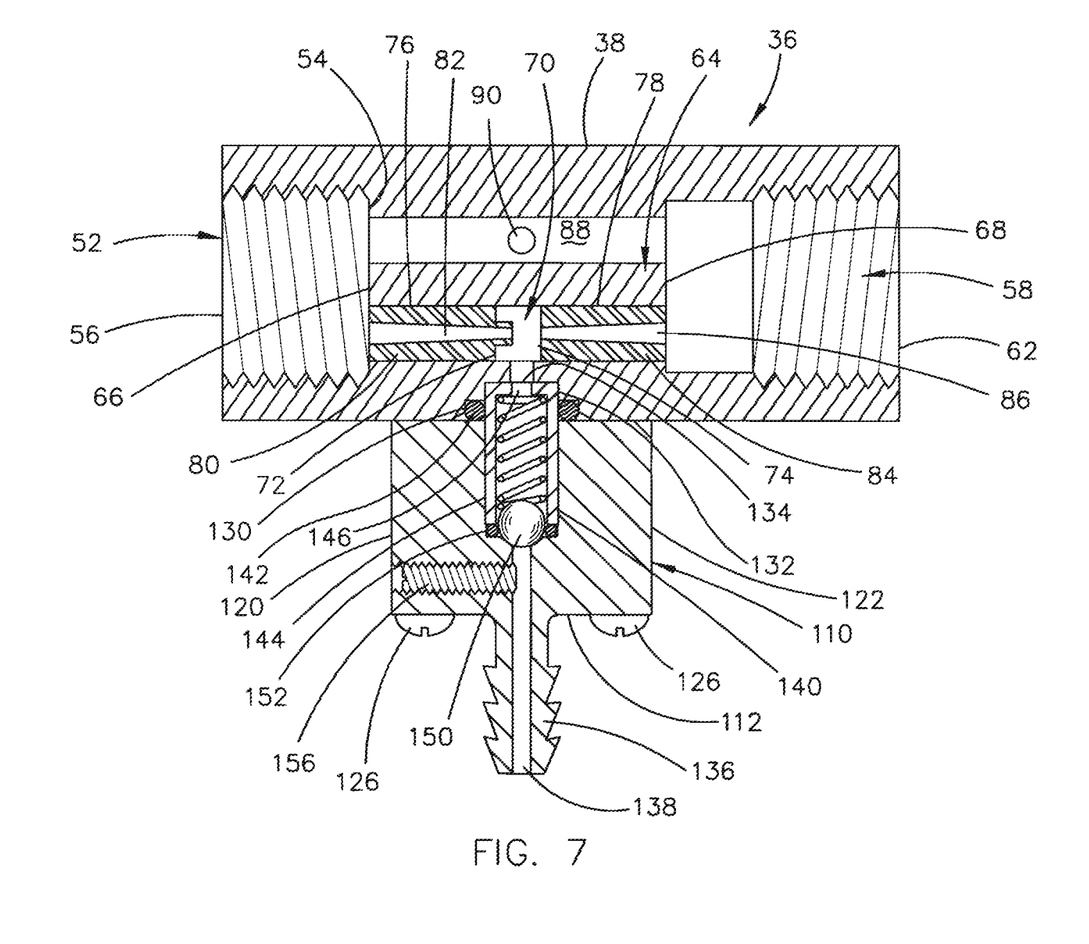
FIG. 7 is a sectional view of the regulator as seen on lines 7-7 of FIG. 4.

The numeral 64 refers to a body portion of elongated body 38 having a first end 66 and a second end 68. The body portion 64 has a venturi chamber 70 formed therein and which has a first end 72 and a second end 74. Body portion 64 has an elongated bore 76 formed therein which extends inwardly from end 66 to venturi chamber 70. Body portion 64 also has an elongated bore 78 formed therein which extends from venturi chamber 70 to end 68 of body portion 64. An elongated insert 80 is positioned in bore 76 and has a bore 82 formed therein. Bore 82 has a smaller diameter than bore 76 and is preferably tapered as seen in FIG. 7. An insert 84 is positioned in bore 78 and has a bore 86 formed therein. Bore 86 has a smaller diameter than bore 78 and is preferably tapered as seen in FIG. 7.

Figure 6:
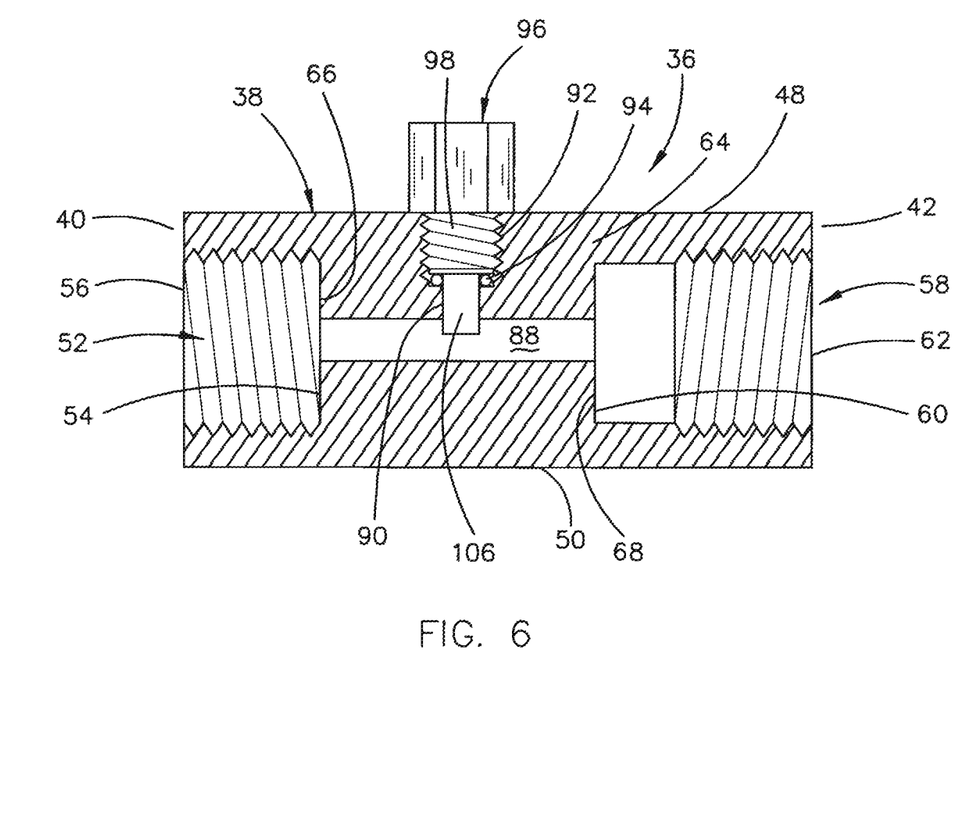
FIG. 6 is a sectional view of the regulator as seen on lines 6-6 of FIG. 4.

Body portion 64 also has an elongated bore 88 formed therein which extends between ends 66 and 68 of body portion 64. Body portion 64 has a small bore 90 formed therein which communicates with bore 88 as seen in FIG. 6. A threaded bore 92 extends into the upper side 48 of body 38 of regulator 36 and communicates with opening 88. An O-ring 94 is positioned in the inner end of bore 92. The numeral 96 refers to a water metering screw support having a reduced diameter threaded portion 98 at its inner end which is threadably mounted in threaded bore 92 of body 38. Support 96 has an internally threaded bore 100 formed therein which extends between the ends of support 96. The numeral 102 refers to an elongated water metering screw having a threaded portion 104 and a head 106. The threaded portion 104 of screw 102 is adjustably threadably mounted in bore 100. The head 106 of screw 102 is received in bore 90 of body portion 64 and adjustably protrudes into bore 88 of body portion 64. The threadable rotation of screw 102 in one direction with respect to support 96 causes head 106 to move further into bore 88. The threadable rotation of screw 102 in an opposite direction moves heat out of bore 88. The metering screw 102 regulates the flow of water through bore 88.

Figure 5:
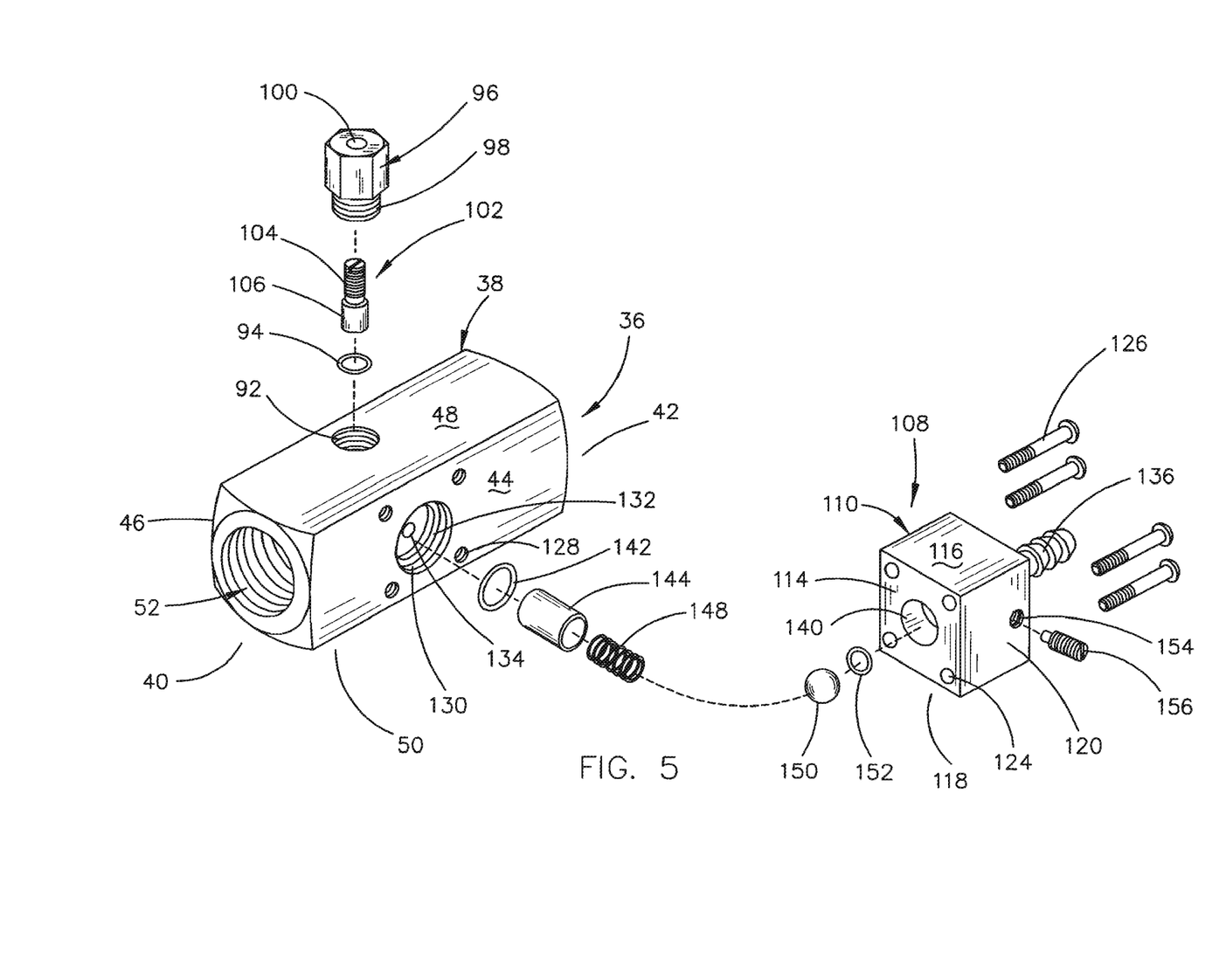
FIG. 5 is an exploded perspective view of the regulator and the gas adjustment housing and related components thereof.

The numeral 108 refers to an ozone metering device which includes an ozone adjustment housing 110 having an outer end 112, an inner end 114, an upper side 116, a lower side 118, a first side 120 and a second side 122. Housing 110 has four bolt or screw openings 124 extending therethrough which are configured to have bolts or screws 126 extending therethrough. The threaded ends of bolts or screws 126 are configured to be threadably mounted in threaded openings 128 formed in regulator 36 as seen in FIG. 5. As also seen in FIG. 5, the side 44 of body 38 of regulator 36 has an annular recess 130 formed therein which communicates with an opening 132. A small opening or bore 134 extends inwardly from opening 132 to the Venturi chamber 70.

Housing 110 has a barbed tube fitting 136 extending therefrom. An ozone passageway 138 extends inwardly through fitting 136. As seen in FIG. 7, ozone passageway 138 includes an enlarged passageway portion 140. An O-ring 142 is positioned in recess 130. The inner end of tube 144 is positioned in passageway 140 as seen in FIG. 7. The inner end of tube 144 has an opening 146 formed therein.

A spring 148 is positioned in tube 144. Spring 148 urges check valve ball 150 into engagement with O-ring 152 which defines a valve seat. Thus, the check valve ball 150 is normally closed. However, check valve ball 150 will be drawn inwardly when the system is operating due to the venturi effect in venturi chamber 70. Housing 110 also includes an internally threaded bore 154 extending into housing 110 so as to be in communication with passageway 138. An ozone metering screw 156 is threadably mounted in bore 154. The metering screw 156 may be threadably adjusted so that the inner end of screw 156 will regulate the flow of ozone through passageway 138.

Preferably an air tube 158 is connected to the input side of connector 16 and extends therefrom. Air tube 158 extends to the air discharge side 160 of a desiccate air dryer 162. As seen, air dryer 162 is preferably vertically disposed and is mounted at one side of the housing 20. Air dryer 162 has an air intake fitting 164 at its lower end. Air tube 166 extends from air intake fitting 164. The numeral 168 refers to a pump which is an adjustable/variable air pump having a output range of 0.14 GPM/0.5 LPM @ 2.9 PSI to 2.83 GPM/10.7 LPM @ 2.32 PSI. A suitable air pump is the air pump AIR-4000 air pump of Danner Mfg. Co. Air pump 168 is an AC120v, 60H3 and 3.5 W air pump. Air pump 168 is designated as a TOP FIN® air pump. Air pump 168 is powered by an electrical cord 170 which extends to an electrical receptacle 171 which is electrically connected to the electrical circuitry of the system 10.

Air pump 168 has a pair of air output lines 172 and 174 extending from the air discharge side thereof which are connected to the air line or tube 166 which is connected to the air inlet side 164 of dryer 162 as described above.

The operation of the system 10 will now be described. The air pump 168 is activated to supply a variable amount of pressurized air to the air dryer which dries the pressurized air and supplies the dried pressurized air to the first ozone generator 14 by way of the tube 158, connector 16 and tube 17. The valve 29 will be electrically opened so that water from the source of water will flow through the open valve 29. The water will then be supplied to the water inlet opening 52 of regulator 36. The water flows through bore 88 and exits from the discharge opening 58. The operator will threadably adjust the flow of water by rotating the elongated water metering screw 102 until the desired water flow rate is achieved. A portion of the water entering the water inlet opening 52 will pass through the bore 76 of the tapered insert 80 and into the venturi chamber 70 and then pass through the bore 86 of insert 84. The water exiting from insert 84 will exit the regulator 36 by way of the opening 58 of regulator 36. The water initially exiting the regulator will initially be deposited into a bucket or the like. The ozone generators 14 will then be activated, if not done so previously. The water passing through the Venturi chamber 70 creates a venturi effect therein. The ozone metering screw 156 will usually be in the position of FIG. 7. Ozone will then pass through ozone passageway 138 due to the suction created by the venturi effect in venturi chamber 70. The suction created by the venturi effect will draw or suck the ozone through the passageway 138. The suction in passageway 138 also causes the check valve ball 150 to unseat from the valve seat 156. The ozone then passes into the venturi chamber 70 where it is mixed with the water passing through the venturi chamber 70. The water ozone solution will then pass through bore 86 and will further be mixed with the water passing outwardly from bore 88. The water-ozone solution will then be measured in conventional fashion. The operator will adjust the ORP of the water-ozone solution by adjusting the metering screw 156. The operator may also adjust the water flow rate by means of the adjustment screw 106.

When the water-ozone solution has reached the desired ORP, a hose or the like may be attached to the outlet 32 to enable the water-ozone solution to be sprayed onto hard surfaces and equipment such as food service equipment to cleanse and/or degrease the same.

The use of the air pump 168 to provide a pressurized air supply system allows for maintaining consistent ORP of the solution even when there is a fluctuation or change in the water input pressure. The air pump 168 eliminates the problems faced in the industry with changing input with pressure drops which impacts the required ORP.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A system for creating an oxidation reduction potential (ORP) in water for the pathogenic cleansing of equipment, comprising:
  an ozone generator configured to generate ozone with said ozone generator having an air inlet side and an ozone outlet side;
  a regulator having an elongated body with a first end, a second end, a front side, a back side, an upper side and a lower side;
  said first end of said regulator having a water inlet opening extending thereinto;
  said water inlet opening having inner and outer ends;
  said water inlet opening of said regulator being in communication with a source of water;
  said second end of said regulator having a water-ozone solution discharge opening extending thereinto;
  said water-ozone solution discharge opening having inner and outer ends;
  said elongated body having a body portion, with first and second ends, positioned between said inner end of said water inlet opening and said inner end of said water-ozone solution discharge opening;
  said body portion having a venturi chamber, with first and second ends, formed therein between said first and second ends of said body portion;
  said body portion having a first elongated bore, having inner and outer ends, formed therein which extends between said first end of said body portion and said venturi chamber;
  said body portion having an elongated second bore, having inner and outer ends, formed therein which extends from said venturi chamber to said inner end of said water-ozone solution discharge opening;
  an ozone adjustment housing secured to said body of said regulator at said front side of said elongated body of said regulator;
  said ozone adjustment housing having an inner end, an outer end, a first side and a second side;
  said ozone adjustment housing having an ozone passageway formed therein extending between said outer and inner ends of said ozone adjustment housing;
  said ozone passageway being in communication with said ozone outlet side of said ozone generator whereby ozone produced by said ozone generator will pass inwardly through said ozone passageway in said ozone adjustment housing;
  said ozone adjustment housing having an ozone metering adjustment screw which threadably extends inwardly into said ozone adjustment housing through said second side of said ozone adjustment housing into said ozone passageway in said ozone adjustment housing for adjustably regulating the flow of ozone therethrough;
  said body portion having an elongated third bore formed therein which extends from said first end of said body portion to said second end of said body portion whereby a portion of water being supplied to said water inlet opening of said regulator will pass through said elongated third bore and whereby a portion of water being supplied to said water inlet opening will pass through said elongated first bore to said venturi chamber and pass through said elongated second bore to said water-ozone solution discharge opening;

said upper side of said elongated body of said regulator having a vertically disposed opening formed therein which has an upper end and a lower end;

said lower end of said vertically disposed opening being in communication with said elongated, third bore;

a vertically adjustable water metering screw, having upper and lower ends, positioned in said vertically disposed opening;

said lower end of said water metering screw being vertically adjustable movable into said elongated third bore to adjust the flow of water through said elongated third bore; and said water passing through said venturi chamber creating a venturi effect which sucks or draws ozone from said ozone passageway of said ozone adjustment housing which is mixed with the water passing through said venturi chamber into said elongated second bore and to be further mixed with the water passing outwardly from said elongated third bore into said water-ozone solution discharge opening and thence outwardly from said second end of said regulator.

2. The system of claim 1 wherein an air pump supplies pressurized air to said air inlet side of said ozone generator.

3. The system of claim 1 wherein an air dryer supplies air to said air inlet side of said ozone generator.

4. The system of claim 3 wherein an air pump supplies pressurized air to said air dryer.

5. The system of claim 1 wherein a plurality of ozone generators are provided which are series connected together.

6. The system of claim 1 further including:
a check valve imposed in said ozone passageway of said ozone adjustment housing;
said check valve being movable between open and closed positions;
said check valve including a spring which yieldably maintains said check valve in said closed position; and
said check valve being movable to said open position by the venturi effect in said venturi chamber.

7. The system of claim 1 wherein an elongated insert is positioned in said first bore and wherein an elongated insert is positioned in said second bore and wherein each of said inserts have a bore extending therethrough.

8. A system for creating an oxidation reduction potential (ORP) in water and for reducing the surface tension of the water for the pathogenic cleansing and/or degreasing of hard surfaces, comprising:
an ozone generator configured to generate ozone;
said ozone generator having an ozone discharge tube extending therefrom;
an ozone adjustment means coupled to said ozone discharge tube;
a regulator having a water inlet end, a water-ozone solution outlet end and an ozone inlet;
a first bore formed in said regulator which extends from said water inlet end to said water-ozone solution outlet end of said regulator;
a second bore formed in said regulator which extends from said water inlet end to said water-ozone solution end of said regulator;
said second bore of said regulator having a venturi chamber formed therein between said water inlet end and said water solution discharge end of said regulator;
said venturi chamber being in operative communication with said ozone discharge tube;
said water inlet end of said regulator being in communication with a source of water;
a first adjustment means associated with said first bore for adjusting the flow of water therethrough;
a second adjustment means for controlling the flow of ozone into said venturi chamber; and
said water-ozone solution which is discharged from said water-ozone discharge outlet having an ORP of at least 600 millivolts and a surface tension of about 48-58 Millinewtons per meter at 20 degrees Centigrade.

9. The system of claim 8 further including means for supplying pressurized and dried air to said ozone generator.

10. A system for creating an oxidation reduction potential (ORP) in water for the pathogenic cleansing of equipment, comprising:
an ozone generator configured to generate ozone with said ozone generator having an air inlet side and an ozone outlet side;
an electrically driven air pump having an air discharge side;
an air dryer having an air intake side and an air discharge side;
said air discharge side of said air pump being connected to said air intake side of said air dryer for supplying pressurized air to said air dryer;
said air discharge side of said air dryer being connected to said air inlet side of said ozone generator;
a regulator having an elongated body with a first end, a second end, a front side, a back side, an upper side and a lower side;
said first end of said regulator having a water inlet opening extending thereinto;
said water inlet opening having inner and outer ends;
said water inlet opening of said regulator being in communication with a source of water;
said second end of said regulator having a water-ozone solution discharge opening extending thereinto;
said water-ozone solution discharge opening having inner and outer ends;
said elongated body having a body portion, with first and second ends, positioned between said inner end of said water inlet opening and said inner end of said water-ozone solution discharge opening;
said body portion having a venturi chamber, with first and second ends, formed therein between said first and second ends of said body portion;
said body portion having a first elongated bore, having inner and outer ends, formed therein which extends from said first end of said body portion to said venturi chamber;
said body portion having an elongated second bore, having inner and outer ends, formed therein which extends from said venturi chamber to said inner end of said water-ozone solution discharge opening;
an ozone adjustment housing secured to said body of said regulator at said front side of said elongated body of said regulator;
said ozone adjustment housing having an inner end, an outer end, an upper side, a lower side, a first side and a second side;

said ozone adjustment housing having an ozone passageway formed therein extending between said outer and inner ends of said ozone adjustment housing;

said outer end of said ozone passageway being in communication with said ozone outlet side of said ozone generator whereby ozone produced by said ozone generator will pass inwardly through said ozone passageway in said ozone adjustment housing;

said ozone adjustment housing having an ozone metering adjustment screw which threadably extends inwardly into said ozone adjustment housing through said side wall of said ozone adjustment housing into said ozone passageway in said ozone adjustment housing for adjustably regulating the flow of ozone therethrough;

said body portion having an elongated third bore formed therein which extends between said first end of said body portion to said second end of said body portion whereby a portion of water being supplied to said water inlet opening of said regulator will pass through said elongated third bore and whereby a portion of water being supplied to said water inlet opening will pass through said elongated first bore to said venturi chamber and pass through said elongated second bore to said water-ozone solution discharge opening;

said upper side of said elongated body of said regulator having a vertically disposed opening formed therein which has an upper end and a lower end;

said lower end of said vertically disposed opening being in communication with said elongated third bore;

a vertically adjustable water metering screw, having upper and lower ends, positioned in said vertically disposed opening;

said lower end of said water metering screw being vertically adjustable movable into said elongated third bore to adjust the flow of water through said elongated third bore; and said water passing through said venturi chamber creating a venturi effect which sucks or draws ozone from said ozone passageway of said ozone adjustment housing which is mixed with the water passing through said venturi chamber into said elongated second bore and to be further mixed with the water passing outwardly from said elongated third bore into said water-ozone solution discharge opening and thence outwardly from said second end of said regulator.

11. The system of claim 10 wherein said air pump has an adjustable and variable air output.

12. The system of claim 10 wherein the air output of said air pump has a range of 0.14 GPM/0.5 LPM@2.9 PSI to 2.83 GPM/10.7 LPM@2.32 PSI.

* * * * *